(12) United States Patent
Jung et al.

(10) Patent No.: US 8,396,001 B2
(45) Date of Patent: Mar. 12, 2013

(54) INTERACTIVE QUEUED MAPPING METHOD AND SYSTEM

(75) Inventors: Edward K. Y. Jung, Bellevue, WA (US); Royce A. Levien, Lexington, MA (US); Robert W. Lord, Seattle, WA (US); Mark A. Malamud, Seattle, WA (US); John D. Rinaldo, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 790 days.

(21) Appl. No.: 11/050,642

(22) Filed: Feb. 3, 2005

(65) Prior Publication Data

US 2006/0171325 A1 Aug. 3, 2006

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. .................. 370/252; 455/404.2; 455/456.1

(58) Field of Classification Search .................. 370/252; 455/404.2, 456.1
See application file for complete search history.

(56) References Cited

U.S. PATENT DOCUMENTS

| | | | |
|---|---|---|---|
| 4,301,506 A | 11/1981 | Turco | |
| 4,528,552 A | 7/1985 | Moriyama et al. | |
| 4,546,439 A | 10/1985 | Esparza | |
| 4,570,227 A | 2/1986 | Tachi et al. | |
| 4,646,089 A | 2/1987 | Takanabe et al. | |
| 4,734,863 A | 3/1988 | Honey et al. | |
| 4,764,873 A | 8/1988 | Libby | |
| 4,796,189 A | 1/1989 | Nakayama et al. | |
| 4,866,626 A | 9/1989 | Egli | |
| 4,876,651 A | 10/1989 | Dawson et al. | |
| 4,890,104 A | 12/1989 | Takanabe et al. | |
| 4,914,605 A | 4/1990 | Loughmiller et al. | |
| 4,926,336 A | 5/1990 | Yamada | |
| 4,937,753 A | 6/1990 | Yamada | |
| 4,954,958 A | 9/1990 | Savage et al. | |
| 4,962,458 A | 10/1990 | Verstraete | |
| 4,984,168 A | 1/1991 | Neukrichner et al. | |
| 5,031,104 A | 7/1991 | Ikeda et al. | |
| 5,041,983 A | 8/1991 | Nakahara et al. | |
| 5,067,081 A | 11/1991 | Person | |
| 5,115,399 A | 5/1992 | Nimura et al. | |
| 5,168,452 A | 12/1992 | Yamada et al. | |
| 5,170,353 A | 12/1992 | Verstraete | |
| 5,172,321 A | 12/1992 | Ghaem et al. | |
| 5,189,430 A | 2/1993 | Yano et al. | |
| 5,191,406 A | 3/1993 | Brandestini et al. | |
| 5,191,532 A | 3/1993 | Moroto et al. | |

(Continued)

OTHER PUBLICATIONS

Jonathan W. Lowe, "Raster-Oriented Technology Supports Public Internet Applications That Manage Large Raster Collections," Geospatial Solutions (Oct. 2004) (4 pages).

(Continued)

*Primary Examiner* — Jae Y Lee (57) ABSTRACT

Provided is a computer system and/or method according to an embodiment that includes but is not limited to receiving data concerning the location; processing the received data to determine a queue for the location; and transmitting one or more queue-related data objects to the at least two components, the at least two components distributed within the predetermined area.

24 Claims, 6 Drawing Sheets

U.S. PATENT DOCUMENTS

| | | | |
|---|---|---|---|
| 5,231,584 A | 7/1993 | Nimura et al. | |
| 5,270,937 A | 12/1993 | Link et al. | |
| 5,274,387 A | 12/1993 | Kakihara et al. | |
| 5,293,163 A | 3/1994 | Kakihara et al. | |
| 5,802,526 A | 9/1998 | Fawcett et al. | |
| 5,844,570 A | 12/1998 | Curtright et al. | |
| 5,884,262 A | 3/1999 | Wise et al. | |
| 5,948,040 A | 9/1999 | DeLorme et al. | |
| 6,009,403 A | 12/1999 | Sato | |
| 6,084,882 A | 7/2000 | Ogura et al. | |
| 6,104,790 A | 8/2000 | Narayanaswami | |
| 6,119,095 A | 9/2000 | Morita | |
| 6,240,360 B1 | 5/2001 | Phelan | |
| 6,282,489 B1 | 8/2001 | Bellesfield et al. | |
| 6,321,158 B1 | 11/2001 | DeLorme et al. | |
| 6,347,299 B1 | 2/2002 | Holzman et al. | |
| 6,381,534 B2 | 4/2002 | Takayama et al. | |
| 6,493,428 B1 | 12/2002 | Hillier | |
| 6,496,842 B1 | 12/2002 | Lyness | |
| 6,498,982 B2 | 12/2002 | Bellesfield et al. | |
| 6,542,593 B1 | 4/2003 | Bowman-Amuah | |
| 6,553,309 B2 | 4/2003 | Uchida et al. | |
| 6,570,595 B2 | 5/2003 | Porter | |
| 6,636,803 B1 | 10/2003 | Hartz, Jr. et al. | |
| 6,680,999 B1 | 1/2004 | Garcia | |
| 6,718,017 B1 | 4/2004 | Price et al. | |
| 6,728,731 B2 | 4/2004 | Sarukkai et al. | |
| 6,731,625 B1 | 5/2004 | Eastep et al. | |
| 6,801,604 B2 | 10/2004 | Maes et al. | |
| 6,816,779 B2 | 11/2004 | Chen et al. | |
| 6,826,474 B2 | 11/2004 | Miyahara et al. | |
| 6,839,023 B1 | 1/2005 | Benco et al. | |
| 6,868,333 B2 | 3/2005 | Melen | |
| 7,058,507 B2 | 6/2006 | Saiki | |
| 7,236,173 B2 | 6/2007 | Chithambaram et al. | |
| 7,292,935 B2 | 11/2007 | Yoon | |
| 2002/0083000 A1* | 6/2002 | Kawai | 705/51 |
| 2002/0174003 A1 | 11/2002 | Redmann et al. | |
| 2003/0102956 A1* | 6/2003 | McManus et al. | 340/5.2 |
| 2003/0134648 A1 | 7/2003 | Reed et al. | |
| 2004/0015293 A1 | 1/2004 | Randazzo et al. | |
| 2004/0054428 A1 | 3/2004 | Sheha et al. | |
| 2004/0172192 A1 | 9/2004 | Knutson | |
| 2004/0172316 A1* | 9/2004 | Hale et al. | 705/5 |
| 2004/0193707 A1* | 9/2004 | Alam et al. | 709/223 |
| 2004/0217884 A1 | 11/2004 | Samadani et al. | |
| 2004/0224703 A1* | 11/2004 | Takaki et al. | 455/457 |
| 2004/0254723 A1 | 12/2004 | Tu | |
| 2005/0032556 A1 | 2/2005 | Bennett et al. | |
| 2005/0058108 A1* | 3/2005 | Ekberg et al. | 370/338 |
| 2005/0072116 A1 | 4/2005 | Bunte | |
| 2005/0078619 A1* | 4/2005 | McClendon | 370/312 |
| 2005/0102099 A1 | 5/2005 | Linn | |
| 2005/0102245 A1 | 5/2005 | Edlund et al. | |
| 2005/0131643 A1 | 6/2005 | Shaffer et al. | |
| 2006/0040670 A1 | 2/2006 | Li et al. | |
| 2006/0058948 A1* | 3/2006 | Blass et al. | 701/207 |
| 2006/0168592 A1 | 7/2006 | Andrews et al. | |
| 2008/0192713 A1* | 8/2008 | Mighani et al. | 370/338 |

OTHER PUBLICATIONS

Joachim Bobrich, et al., "Augented Maps," Symposium on Geospatial Theory, Processing and Applications; Univ. of Hanover, 2002.

Gluck, Myke, Ph.D., et al., "Augemented Seriation: Usability of a Visual and Auditory Tool for Geographic Pattern Discovery wth Risk Perception Data," GeoComputation 1999; p. 1.

Introduction to Augmented Reality; www.se.rit.edu/-jrv/research/ar/introction html; printed Dec. 15, 2004; 11 pages.

Seattle Area Traffic Home, web page, Dec. 10, 2004, 11:14 A.M., www.wsdot.wa.gov/traffic/seattle.

Hall, T. Brett et al., "A Novel Interactivity Environment for Integrated Intelligent Transportation and Telematic Systems", 5th Intl. IEEE Conf., Singapore, Sep. 3, 2002.

Wei, Li-Yi and LeVoy, Marc; "Fast Texture Synthesis Using Tree-Structured Vector Quantization," Stanford University, pp. 1-10.

Zhong, David X.; "Color Space Analysis and Color Image Segmentation," School of Electrical and Information Engineering, The University of Sydney, pp. 1-5.

Espatial: iSMART Overview; located at www.espatial.com/page455.html bearing a date of Feb. 8, 2005 (3 pp.).

U.S. Appl. No. 11/124,626, Jung et al.
U.S. Appl. No. 11/047,465, Jung et al.
U.S. Appl. No. 11/058,399, Jung et al.
U.S. Appl. No. 11/066,112, Jung et al.
U.S. Appl. No. 11/086,973, Jung et al.
U.S. Appl. No. 11/998,450, Jung et al.
U.S. Appl. No. 11/998,827, Jung et al.
U.S. Appl. No. 11/998,871, Jung et al.
U.S. Appl. No. 12/231,314, Jung et al.
U.S. Appl. No. 12/231,325, Jung et al.

* cited by examiner

INTERACTIVE QUEUED MAPPING METHOD AND SYSTEM

TECHNICAL FIELD

The present application relates generally to maps.

SUMMARY

In one aspect, a method includes but is not limited to receiving data concerning the location; processing the data to determine a queue for the location; and transmitting one or more queue-related data objects to the plurality of components, the plurality of components distributed within the predetermined area. In addition to the foregoing, other method aspects are described in the claims, drawings, and text forming a part of the present application.

In one aspect, a method for a mobile mapping device to receive one or more queue-related data objects to control positioning of the mobile mapping device relative to a location within a predetermined area includes but is not limited to connecting with a decision-making device, transmitting location data of the mobile mapping device, downloading one or more queue-related data objects from the decision-making device, the queue-related data objects determined using one or more location sources; and displaying at least a portion of the one or more queue-related data objects on the mobile mapping device, the portion of the one or more queue-related data objects controlling positioning of the mobile mapping device relative to the location and relative to at least another mobile mapping device. In addition to the foregoing, other method aspects are described in the claims, drawings, and text forming a part of the present application.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, a system includes but is not limited to a processor; a memory coupled to the processor; a queuing module coupled to the memory, the queuing module configured to determine a queue to control positioning of at least two components relative to a location within a predetermined area, the queuing module including a data store configured to store data concerning the location; and a transmitter coupled to the queuing module, the transmitter configurable to transmit one or more of the queue, one or more queue-related data objects, and/or instructions related to the queue to the at least two components. In addition to the foregoing, other system aspects are described in the claims, drawings, and text forming a part of the present application.

In addition to the foregoing, various other method and/or system aspects are set forth and described in the text (e.g., claims and/or detailed description) and/or drawings of the present application.

The foregoing is a summary and thus contains, by necessity, simplifications, generalizations and omissions of detail; consequently, those skilled in the art will appreciate that the summary is illustrative only and is NOT intended to be in any way limiting. Other aspects, features, and advantages of the devices and/or processes and/or other subject described herein will become apparent in the text set forth herein.

BRIEF DESCRIPTION OF THE DRAWINGS

A better understanding of the subject matter of the present application can be obtained when the following detailed description of the disclosed embodiments is considered in conjunction with the following drawings, in which.

DETAILED DESCRIPTION OF THE DRAWINGS

Those with skill in the computing arts will recognize that the disclosed embodiments have relevance to a wide variety of applications and architectures in addition to those described below. In addition, the functionality of the subject matter of the present application can be implemented in software, hardware, or a combination of software and hardware. The hardware portion can be implemented using specialized logic; the software portion can be stored in a memory or recording medium and executed by a suitable instruction execution system such as a microprocessor.

Figure 1:
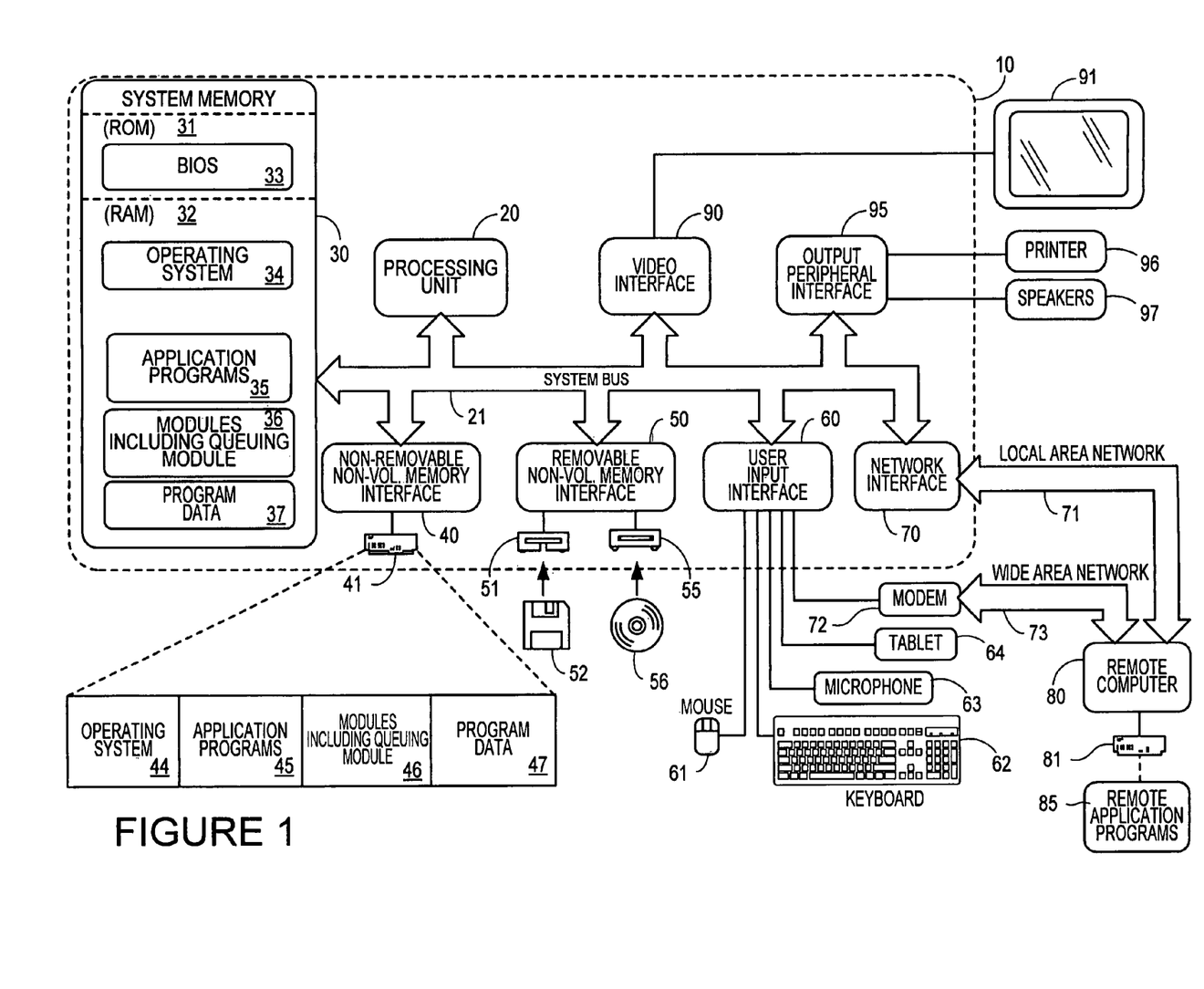
FIG. 1 is a block diagram of an exemplary computer architecture that supports the claimed subject matter.

With reference to FIG. 1, an exemplary computing system for implementing the embodiments and includes a general purpose computing device in the form of a computer 10. Components of the computer 10 may include, but are not limited to, a processing unit 20, a system memory 30, and a system bus 21 that couples various system components including the system memory to the processing unit 20. The system bus 21 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 10 typically includes a variety of computer readable media. Computer readable media can be any available media that can be accessed by the computer 10 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 10. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above could also be included within the scope of computer readable media.

The system memory 30 includes computer storage media in the form of volatile and/or nonvolatile memory such as read only memory (ROM) 31 and random access memory (RAM) 32. A basic input/output system 33 (BIOS), containing the basic routines that help to transfer information between elements within computer 10, such as during start-up, is typically stored in ROM 31. RAM 32 typically contains data and/or program modules that are immediately accessible to and/or presently being operated on by processing unit 20. By way of example, and not limitation, FIG. 1 illustrates operating system 34, application programs 35, other program modules 36 and program data 37. FIG. 1 is shown with program modules 36 including a queuing module in accordance with an embodiment as described herein.

The computer 10 may also include other removable/non-removable, volatile/nonvolatile computer storage media. By way of example only, FIG. 1 illustrates a hard disk drive 41 that reads from or writes to non-removable, nonvolatile magnetic media, a magnetic disk drive 51 that reads from or writes to a removable, nonvolatile magnetic disk 52, and an optical disk drive 55 that reads from or writes to a removable, nonvolatile optical disk 56 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 41 is typically connected to the system bus 21 through a non-removable memory interface such as interface 40, and magnetic disk drive 51 and optical disk drive 55 are typically connected to the system bus 21 by a removable memory interface, such as interface 50. An interface for purposes of this disclosure can mean a location on a device for inserting a drive such as hard disk drive 41 in a secured fashion, or a in a more unsecured fashion, such as interface 50, unless context dictates otherwise. In some cases, an interface may include a location for electronically attaching additional parts to the computer 10, unless context dictates otherwise.

The drives and their associated computer storage media, discussed above and illustrated in FIG. 1, provide storage of computer readable instructions, data structures, program modules and other data for the computer 10. In FIG. 1, for example, hard disk drive 41 is illustrated as storing operating system 44, application programs 45, other program modules, including queuing module 46 and program data 47. Program modules 46 is shown including a queuing module, which can be configured as either located in modules 36 or 46, or both locations, as one with skill in the art will appreciate. More specifically, queuing modules 36 and 46 could be in non-volatile memory in some embodiments wherein such a queuing module runs automatically in an environment, such as a theme park. In other embodiments, queuing modules could be part of a personal queuing system on a hand-held device such as a personal digital assistant (PDA) and exist only in RAM-type memory. Note that these components can either be the same as or different from operating system 34, application programs 35, other program modules, including queuing module 36, and program data 37. Operating system 44, application programs 45, other program modules, including queuing module 46, and program data 47 are given different numbers hereto illustrate that, at a minimum, they are different copies. A user may enter commands and information into the computer 10 through input devices such as a tablet, or electronic digitizer, 64, a microphone 63, a keyboard 62 and pointing device 61, commonly referred to as a mouse, trackball or touch pad. Other input devices (not shown) may include a joystick, game pad, satellite dish, scanner, or the like. These and other input devices are often connected to the processing unit 20 through a user input interface 60 that is coupled to the system bus, but may be connected by other interface and bus structures, such as a parallel port, game port or a universal serial bus (USB). A monitor 91 or other type of display device is also connected to the system bus 21 via an interface, such as a video interface 90. The monitor 91 may also be integrated with a touch-screen panel or the like. Note that the monitor and/or touch screen panel can be physically coupled to a housing in which the computing device 10 is incorporated, such as in a tablet-type personal computer. In addition, computers such as the computing device 10 may also include other peripheral output devices such as speakers 97 and printer 96, which may be connected through an output peripheral interface 95 or the like.

The computer 10 may operate in a networked environment using logical connections to one or more remote computers, such as a remote computer 80. The remote computer 80 may be a personal computer, a server, a router, a network PC, a peer device or other common network node, and typically includes many or all of the elements described above relative to the computer 10, although only a memory storage device 81 has been illustrated in FIG. 1. The logical connections depicted in FIG. 1 include a local area network (LAN) 71 and a wide area network (WAN) 73, but may also include other networks. Such networking environments are commonplace in offices, enterprise-wide computer networks, intranets and the Internet. For example, in the subject matter of the present application, the computer system 10 may comprise the source machine from which data is being migrated, and the remote computer 80 may comprise the destination machine. Note however that source and destination machines need not be connected by a network or any other means, but instead, data may be migrated via any media capable of being written by the source platform and read by the destination platform or platforms.

When used in a LAN or WLAN networking environment, the computer 10 is connected to the LAN through a network interface or adapter 70. When used in a WAN networking environment, the computer 10 typically includes a modem 72 or other means for establishing communications over the WAN 73, such as the Internet. The modem 72, which may be internal or external, may be connected to the system bus 21 via the user input interface 60 or other appropriate mechanism. In a networked environment, program modules depicted relative to the computer 10, or portions thereof, may be stored in the remote memory storage device. By way of example, and not limitation, FIG. 1 illustrates remote application programs 85 as residing on memory device 81. It will be appreciated that the network connections shown are exemplary and other means of establishing a communications link between the computers may be used.

In the description that follows, the subject matter of the application will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer which reconfigures or otherwise alters the operation of the computer in a manner well understood by those skilled in the art. The data structures where data is maintained are physical locations of the memory that have particular properties defined by the format of the data. However, although the subject matter of the application is being described in the foregoing context, it is not meant to be limiting as those of skill in the art will appreciate that some of the acts and operation described hereinafter can also be implemented in hardware.

Figure 2:
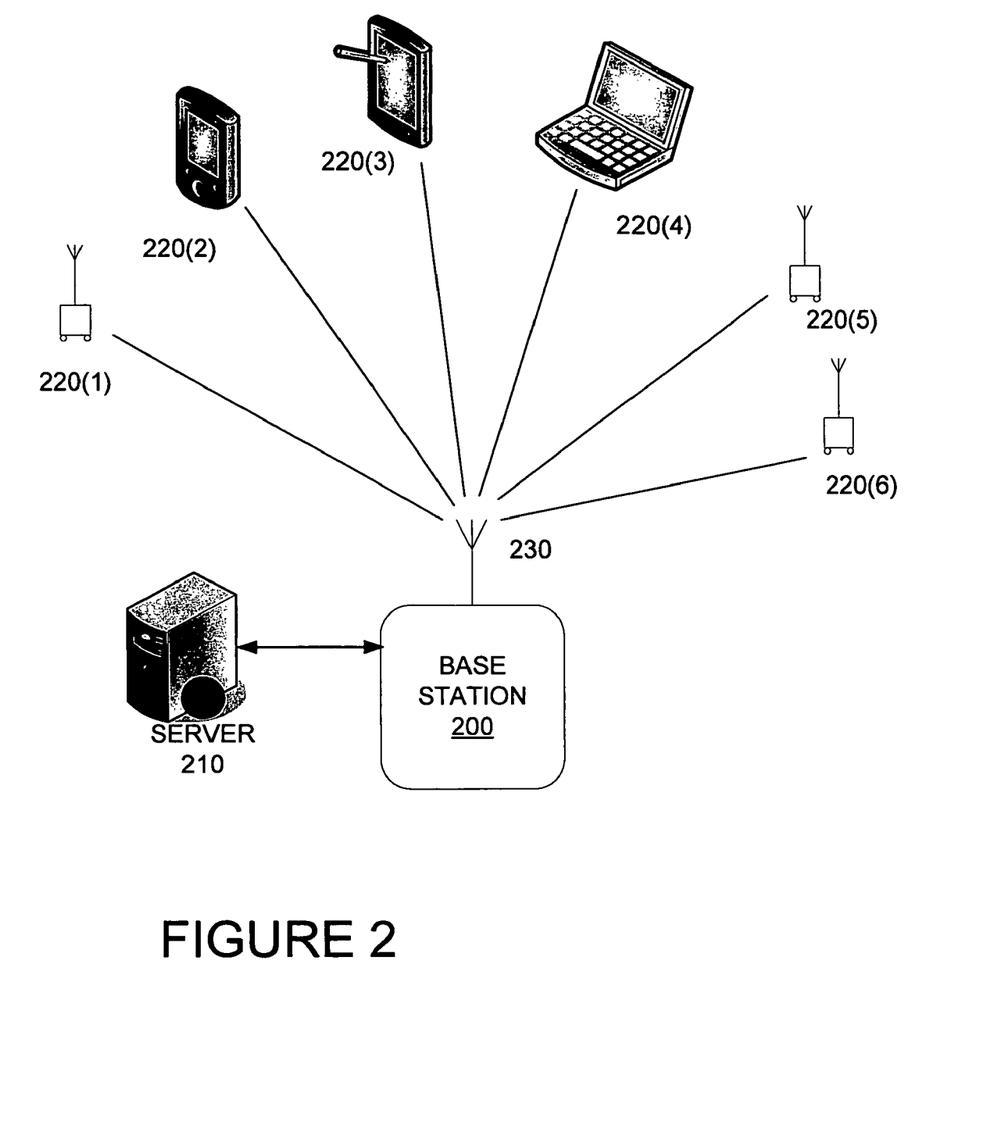
FIG. 2 is a block diagram of a wireless computer environment appropriate for embodiments of the subject matter of the present application.

Referring to FIG. 2, a diagram of a wireless network appropriate for embodiments herein is shown. The wireless network includes a base station 200, which can be coupled to a server 210. The term "server" as used herein may refer to a computing device configurable to be a decision-making device in the context of an environment, which could be a network, having at least two computing devices, one of which being a controllable component. Components 220 as shown in FIG. 2 can be configurable to be controllable components. Alternatively, one or more of components 220 can be configurable to operate as a "server" if they are configurable to be decision-making devices capable of performing at least some of the acts as disclosed herein, as one of skill in the art with the benefit of the present application will appreciate. A "server" may be substantially any decision-making device for purposes of the present application capable of performing in a fashion similar to that described herein and outwardly appearing as a mobile or stationary device, such as a personal computer (PC), a pager, a personal digital assistant (PDA), a wired or wireless telephone, a mapping device, or the like. As one of skill in the art appreciates, the form of a computing device typically relates to the function of a computing device with respect to the size of the form to hold components for computing. Thus, many forms for holding a "server" are within the scope of that term as described herein appropriate to context.

Base station 200 interacts with a plurality of wireless components 220, which can be receivers only, designed to receive a real time map and directions determined at server 210. Components interact with base station 200 via wireless connection 230. The wireless connection 230 could include a wireless local area network connection (WLAN), a radio frequency (RF) connection or other method of wireless communication of data. Other wireless communication connections can include Global Positioning Systems (GPS) or location detection systems such as tracking tags, radio-frequency (RF) methods, and wireless local area network (WLANs). Tracking tags typically communicate with a base station, each tag transmitting a unique code to identify an item to which it is attached. WLANs operate by connecting mobile devices to a base station and using signal strength sensing to determine a location of a mobile device. Other wireless communication connections can include a satellite connection or the like as one of skill in the art with the benefit of the present disclosure will appreciate.

Wireless components 220 can include receivers and transmitters to interact with server 210. Wireless components 220 are shown including different types of components, including component 220(1) which could be a simple device capable of only receiving and displaying data. The data could include written directions or include a map or both. Component 220 (2) is shown as a personal electronic assistant, which could be configured to both send and/or receive data, display maps and/or directions as generated by server 210. Component 220(3) is shown as a tablet personal computer (PC) which can also be configured to both send and/or receive data. Component 220(4) is shown as a laptop or notebook computer which can also send and/or receive data and/or directions. Components 220(5) could be implemented as a simple mobile device which could be configured to receive and display simple commands in real time. Component 220(6) could be implemented as a cellular telephone and include a display configured to show a map and directions in accordance with embodiments herein.

Figure 3:
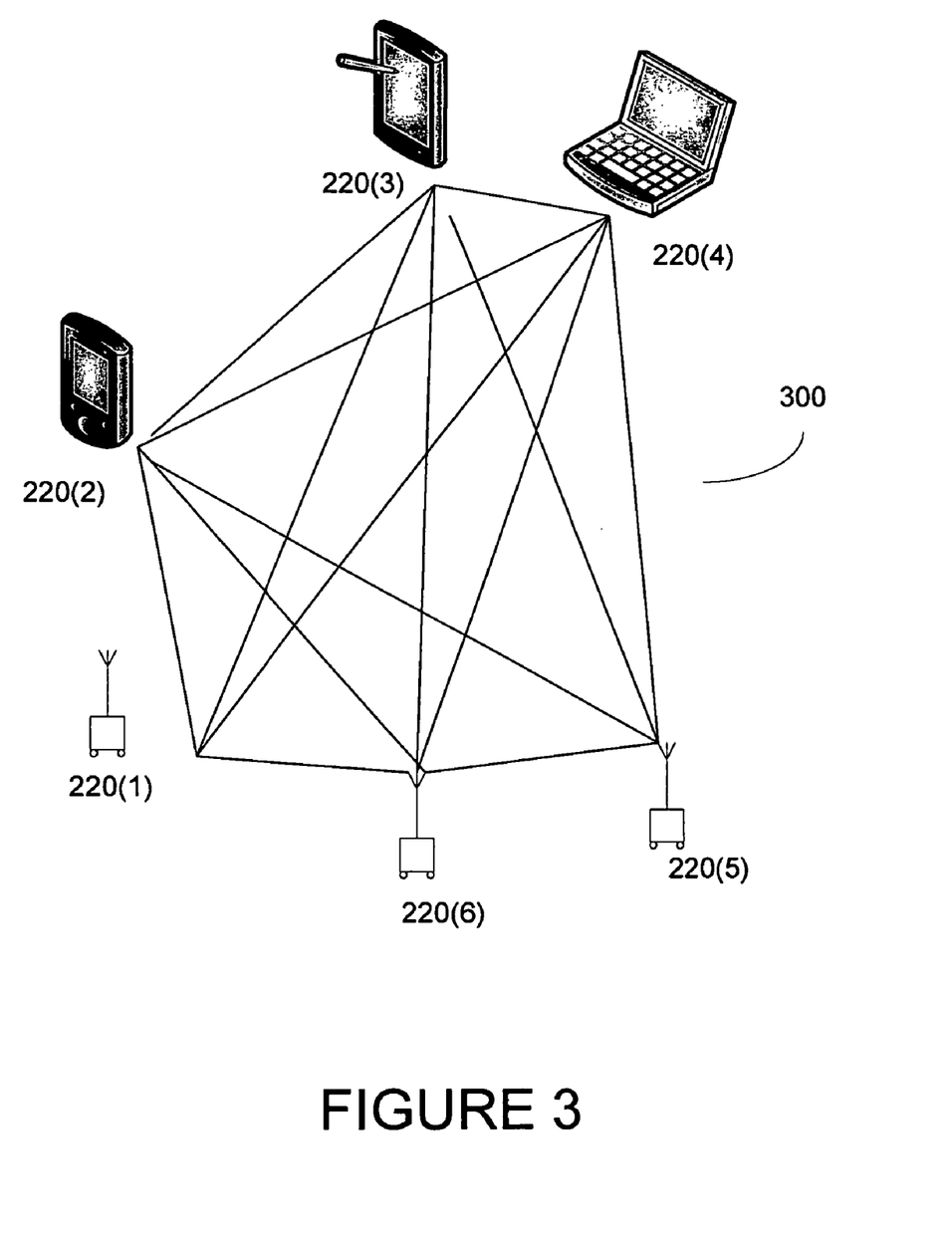
FIG. 3 is a flow diagram illustrating a method in accordance with an embodiment of the subject matter of the present application.

Referring now to FIG. 3, a block diagram illustrates a configuration that does not show the use of a central processor. More particularly, mobile peer devices 220 are each part of a mesh network 300 wherein one or more of the mobile peer devices 220 can operate as a server to direct the other mobile peer devices 220. Alternatively, mobile peer devices 220 can be configured to use the mesh network 300 as a negotiation network wherein a voting protocol is used to determine which goal the mobile peer devices 220 should meet. The mobile peer devices 220 can have a voting control hierarchy to determine which goal of should be followed by the mobile peer devices 220 if several goals are presented as options. One of ordinary skill in the art with the benefit of this disclosure will appreciate that there are several appropriate negotiation network types for a mobile peer mesh network 300 and the choice can be according to system parameters. The mesh network 300 can be configured such that one or more of the mobile peer devices 220 are decision-making devices. For example, notebook computer 220(4) could be designated as a decision-making device for the peer mesh network 300. If notebook computer 220(4) is out-of-range of the peer devices, a hierarchy of devices could be provided such that tablet PC 220(3) could be a default decision-making device if notebook computer 220(4) is not capable of interacting with the mesh network.

Figure 4:
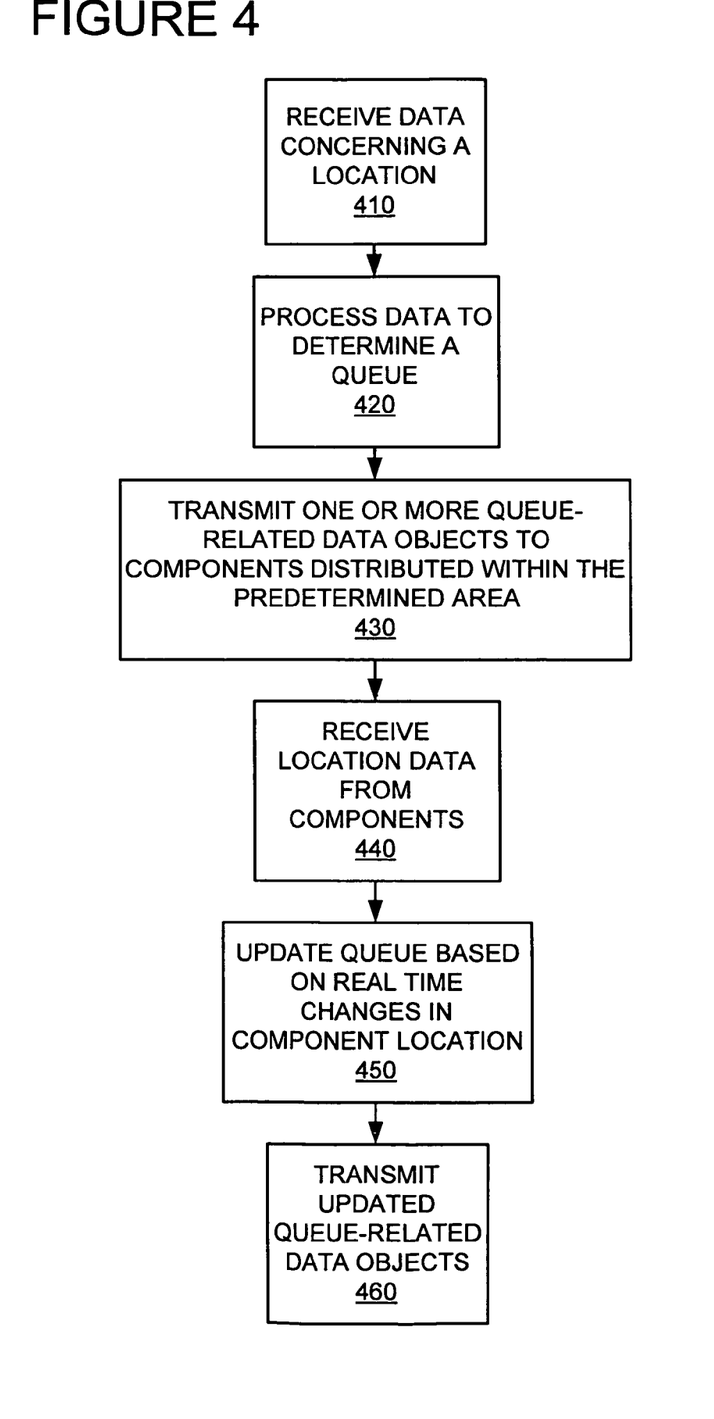
FIG. 4 is a flow diagram illustrating a method in accordance with an embodiment of the subject matter of the present application.

Referring now to FIG. 4, a flow diagram illustrates an embodiment for a server to control positioning by determining a queue. Block 410 provides for receiving data concerning a location. The location can be within a predetermined area wherein at least two components are located. The data can be received via one of several methods as will be appreciated by one of skill in the art and will depend on the type of environment the server is serving. For example, a large area being served with queuing data could mandate use of a global positioning system (GPS). A smaller environment could benefit from a WLAN or the like. Some environments could be served with wireless cellular service.

One type of environment appropriate for embodiments described herein includes an amusement park. Depending on the size of the amusement park, the type of mobile environment could be different. In an amusement park environment or a similar environment, the queuing data provided to components could include data to prevent long lines at certain rides. In an embodiment, a number of rides could be available to guests. If each guest has a component, such as a mobile device identifying each location of the guest, a server such as server 210 could process each location according to a queuing method appropriate for managing the number of rides available for the number of guests at the amusement park.

Block 420 provides for processing the data to determine a queue for the location. The processing can include receiving indications of a hierarchy in users of the components and a status associated therewith. Additionally, the processing could include receiving data concerning third parties and directives associated therewith. More specifically, in one embodiment, the components are used in a theme park or the like wherein lines are formed at one or more locations and the processing relates to directives for controlling positions of guests in the theme park. The processing could include correlating the queue to the location in the predetermined area and identifying a time at which a user is to arrive at the location, for example, a show at the theme park. In one embodiment, the processing is performed at a server, which could be a centralized server, a main server for a theme park, for example. The processing could include identifying components according to a hierarchical listing, receiving location data from at least one of the at least two components, and broadcasting one or more directives and mapping data related to the queue in accordance with the hierarchal listing.

Block 430 provides for transmitting one or more queue-related data objects to the at least two components. The transmitting can be in real time or otherwise. The at least two components can be distributed within the predetermined area. In one embodiment the transmission is in real time to at least two components. The queue-related data objects can include instructions for the at least two components, the queue, and/or status data. The at least two components can be configured to hold data in a data store enabling them to receive the queue and apply filters via a user interface to determine their status.

Alternatively, the at least two components can be configured to display data on the fly or data as it is received in accordance with a simple communication protocol. In a simple communication protocol configured component, data received from a server 210 or other decision-making device could include only status information, directions or other simple directives. For example, a simple device in accordance with an embodiment could download data for purposes of a line at an amusement park and receive a position in a line and/or time expectancy or the like.

Block 440 provides for receiving location data from components. Block 450 provides for updating the queue based on location data, which could be real-time location data, received from the at least two components. Referring back to an amusement park example, server 210 could be configured to take into account changes in queued lines by detecting where each component included in a queue is located. Also, if a user of a component takes a detour, the location of the component can be taken into account for altering a queue. Thus, guests at an amusement park can be directed to shorter lines if a guest exits a line or the like. As a result, the queues for guests can be made more consistent. Block 460 provides for transmitting one or more updated queue-related data objects. The updated queue-related data objects can direct the guests at an amusement park by providing directives, direct them to shorter lines, provide status data for a current line, or other like data.

Figure 5:
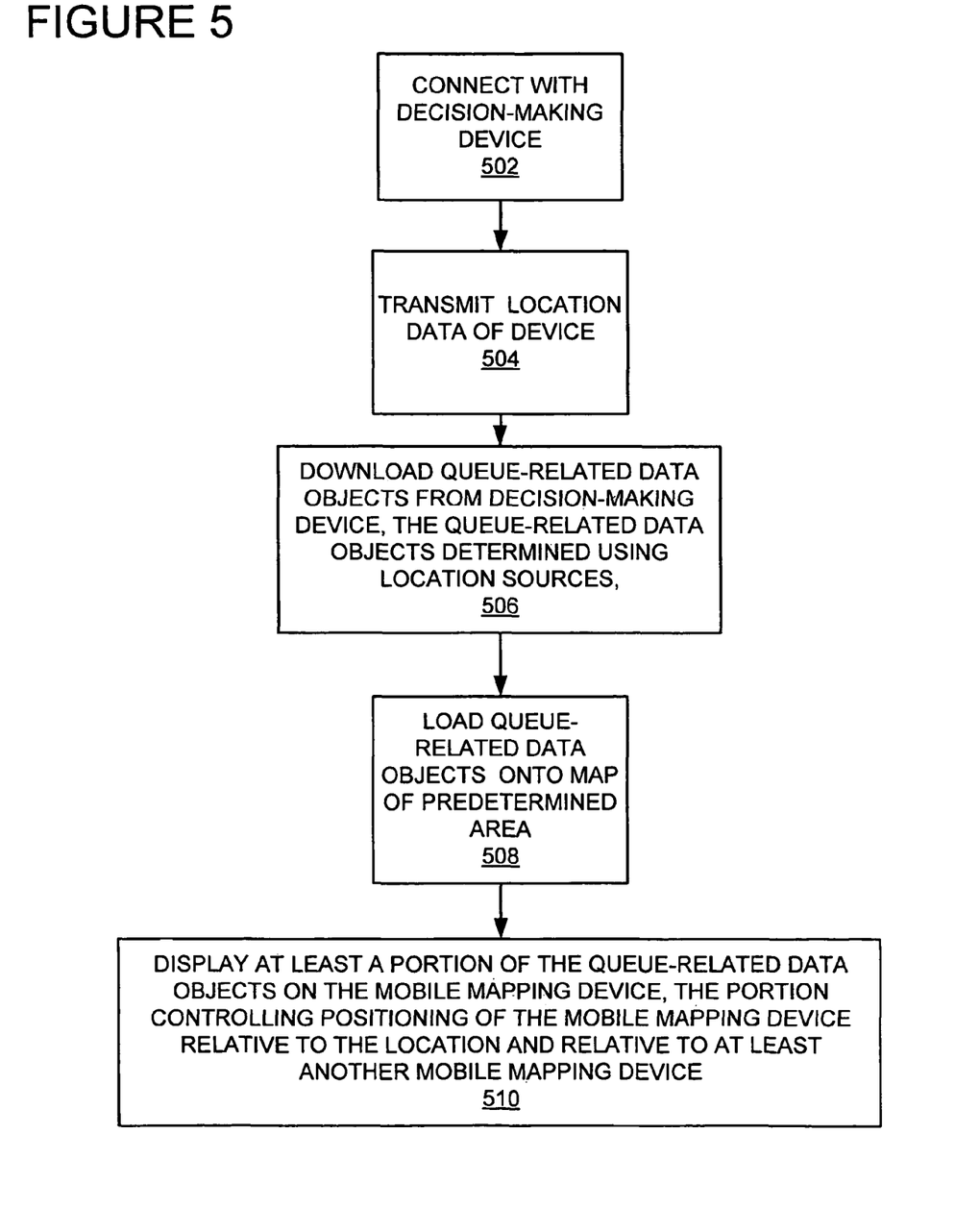
FIGS. 5 and 6 are flow diagrams illustrating methods in accordance with embodiments of the subject matter of the present application.

Referring now to FIG. 5, another flow diagram illustrates a method according to an embodiment directed to a mobile device such as wireless components 220. Block 502 provides for connection with a decision-making device. Block 504 provides for transmitting data of a device, such as wireless components 220, the data could be in real time or otherwise. In an embodiment, components that are capable of transmitting locations can be monitored by a central location such as server 210 so that any alterations to a prior determined map or itinerary can be taken into account in real time. Block 506 provides for downloading one or more queue-related data objects from the decision-making device, the queue-related data objects determined using one or more location sources. The downloading can be initial directions, for example, in an amusement park setting, the initial directions can include an itinerary of rides to be taken by guests purchasing component use rights. Block 508 provides for loading directions into a map. In one embodiment, a component can be a mobile device such as a tablet PC 220(2) that includes a real-time map. Block 510 provides for displaying at least a portion of the queue-related data objects on the mobile mapping device, the portion of the one or more queue-related data objects controlling positioning of the mobile mapping device relative to the location and relative to at least another mobile mapping device. The displaying could include displaying a map including directions and/or an itinerary with times. Alternatively, the displaying could include displaying data relative to at least another location for which the mobile mapping device is directed, the at least another location related to an advertised location. For example, directions past a hot dog stand if the proprietor of a hot dog stand paid for such directions to be transmitted.

Figure 6:
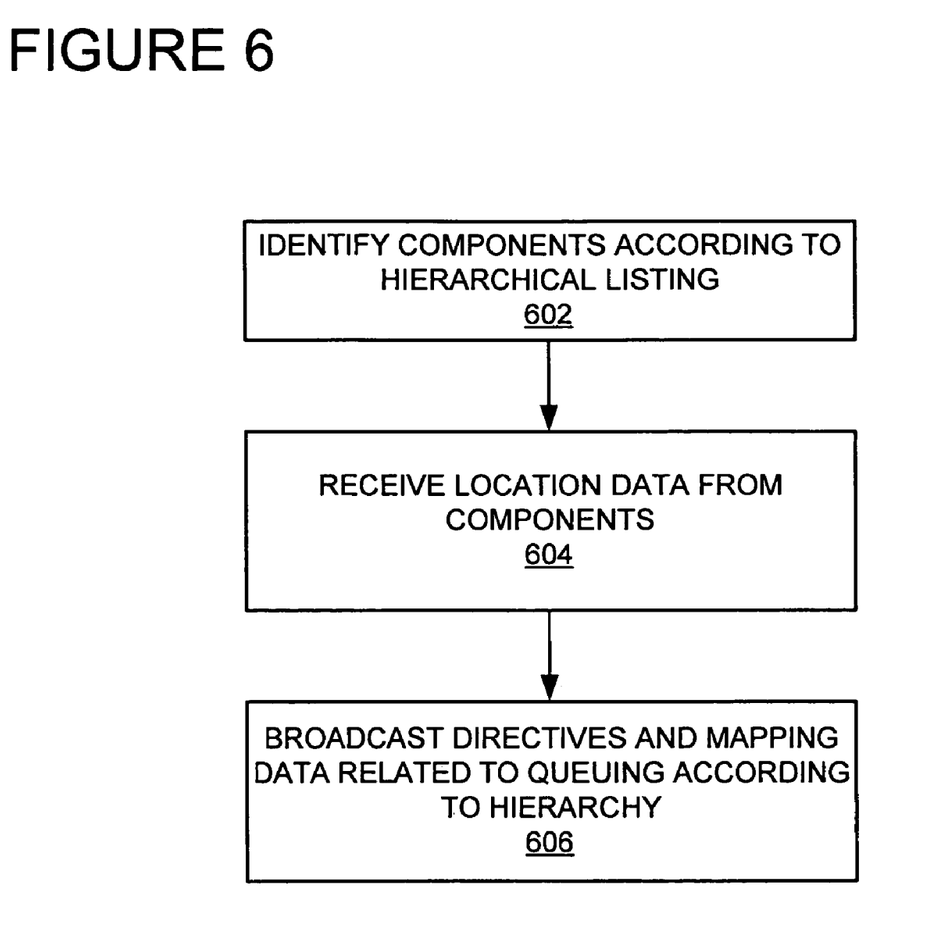

Referring now to FIG. 6, block 602 provides for identifying components according to a hierarchical listing. The hierarchical listing could be a list of locations to which a user of a mobile device should be directed in accordance with a set of parameters. A hierarchy could be processed along with the location data in accordance with predetermined parameters. For example, in an amusement park setting, mobile devices could be purchased by guests at hierarchical amounts. Those guests interested in no waiting in lines could be at the top of the hierarchy. Conversely, guests could purchase a queuing hierarchy as a function of the number of minutes they are willing to wait in a line.

Block 604 provides for receiving location data from components. Block 606 provides for broadcasting directives and mapping data related to queuing according to the hierarchy. In an embodiment, the broadcasting could include using an instant messaging protocol to send directives. For example, guests at an amusement park could have mobile devices configured to only receive and not send location data. The mobile devices could be configured to receive instructions identifying a location to which a user is directed. In an amusement park setting, the mobile devices could be configured to receive the directives via a paging system or the like. The directives can be according to a hierarchy. In an amusement park setting, the hierarchy can be according to a function relating an amount spent for a ticket that determines a length of wait in one or more queues.

While the subject matter of the application has been shown and described with reference to particular embodiments thereof, it will be understood by those skilled in the art that the foregoing and other changes in form and detail may be made therein without departing from the spirit and scope of the subject matter of the application, including but not limited to additional, less or modified elements and/or additional, less or Modified steps performed in the same or a different order.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

We claim:

1. A method to control positioning of at least two components relative to a plurality of venue locations within a predetermined area, the method comprising:

receiving updated location data for at least two components, the at least two components being associated with each other, the at least two components configured to be operated by at least two users, the at least two users being part of a group of users with one or more common goals, the updated location data relative to the plurality of venue locations, the data being received according to a simple communication protocol;

processing the updated location data to determine an updated queue for the plurality of venue locations, the processing including identifying a time at which a user of at least one of the at least two components is to arrive at one of the plurality of venue locations;

transmitting the processed updated location data to a queuing module that determines a position or time expectancy in the updated queue for one of the at least two components; and transmitting a goal from one or more common goals presented as options, the goal determined by a combination of a voting hierarchy and one or more queue-related data objects communicated to the at least two components, the at least two components being distributed within the predetermined area, the voting hierarchy to determine one of the one or more common goals based on the one or more queue-related data objects, the goal including one or more of the venue locations of the plurality of venue locations, wherein transmitting the goal from said one or more common goals includes transmitting the one or more queue-related data objects wirelessly to the at least two components, wherein the at least two components associated with each other are in a mesh network such that one of the at least two components directs the other of the at least two components wherein a voting protocol is used to determine the venue location, and wherein one of the at least two components acts as a server to direct other components of the at least two components, wherein the at least two components are arranged in a hierarchy of components, and wherein when the one of the at least two components acting as the server is out-of-range of other components participating in the mesh network, another one of other components of the at least two components is designated as a new server based on the hierarchy of components.

2. The method of claim 1 wherein the transmitting one or more queue-related data objects to the at least two components includes:
transmitting the one or more queue-related data objects to one or more computing devices including electronic mapping devices, pagers, electronic personal assistants, and/or computers.

3. The method of claim 2 wherein the method further comprises displaying at least a portion of one or more of the queue-related data objects on the one or more computing devices.

4. The method of claim 1 wherein the processing the updated location data to determine the updated queue for the plurality of venue locations includes:
providing one or more directives related to the position or time expectancy in an updated queue to at least two users of the at least two components by taking into account the updated location data for the at least two components.

5. The method of claim 1 wherein the processing the updated location data to determine the updated queue for the plurality of venue locations includes:
correlating the updated queue to at least one of the plurality of venue locations within the predetermined area.

6. The method of claim 1 further comprising:
updating a queue based on real-time location data received from the at least two components; and
transmitting one or more updated queue-related data objects to the at least two components.

7. The method of claim 1 wherein the transmitting one or more queue-related data objects to the at least two components includes:
transmitting a status of the at least two components with respect to the updated queue.

8. The method of claim 1 wherein the transmitting the processed updated location data to the queuing module includes:
wirelessly transmitting the processed updated location data to the queuing module from the server.

9. The method of claim 1 further comprising:
identifying components according to a hierarchical listing, the hierarchical listing including a list of locations in accordance with a set of parameters, the set of parameters including a waiting time; and
broadcasting one or more directives and mapping data related to the updated queue in accordance with the hierarchal listing.

10. The method of claim 1 wherein the data being received includes a real time map and directions.

11. The method of claim 1 wherein when one of the users detours, a location of the respective component can be taken into account for altering a queue, and wherein the detouring component receives directions to another queue so as to encourage queues of users to be more consistent when compared to each other.

12. A computer system for communicating with at least two components relative to a plurality of locations within a predetermined area comprising:
a processor;
a memory coupled to the processor;
a queuing module coupled to the memory, the queuing module configured to
determine a queue to control positioning of the at least two components, the at least two components being associated with each other, the at least two components configured to be operated by at least two users of the at least two components, the queuing module providing position data relative to each of the at least two components and relative to one or more locations within the predetermined area, the queuing module including a data store configured to store data concerning the one or more locations; and
a transmitter coupled to the queuing module, the transmitter configurable to transmit a goal from one or more common goals presented as options, the goal determined by a combination of a voting hierarchy and one or more queue-related data objects communicated to the at least two components, the at least two components being distributed within the predetermined area, the voting hierarchy to determine one of the one or more common goals based on the one or more queue-related data objects, the goal including one or more of the locations of a plurality of locations, wherein transmitting the goal from said one or more common goals includes transmitting one or more queue-related data objects wirelessly to the at least two components, wherein the at least two components associated with each other are in a mesh network such that one of the at least two components directs the other of the at least two components wherein a voting protocol is used to determine the location, and wherein one of the at least two components acts as a server to direct other components of the at least two components, wherein the at least two components are arranged in a hierarchy of components, and wherein where the one of the at least two components acting as the server is out-of-range of other components participating in the mesh network, another one of other components of the at least two components is designated as a new server based on the hierarchy of components.

13. The computer system of claim 12 wherein the transmitter is configurable to transmit the goal to the at least two components in real time.

14. The computer system of claim 12 wherein the at least two components include one or more of electronic mapping devices, electronic personal assistants, pagers and/or computers.

15. A computer program product comprising a non-transitory computer readable medium configured to store executable instructions to perform one or more acts for controlling positioning of a mobile device in a predetermined area, the one or more acts comprising:

receiving data identifying a location of at least two mobile devices within the predetermined area, the at least two mobile devices being associated with each other, the at least two mobile devices configured to be operated by at least two users being part of a group of users with one or more common goals, wherein a voting protocol is used to determine a goal from the one or more common goals;

processing the data to determine an updated queue for a venue location prone to popularity by:

applying a voting hierarchy identifying which of the at least two mobile devices, if any, is entitled to a priority voting status, the voting hierarchy to determine one of the one or more common goals based on one or more queue-related data objects;

determining whether one or more users of the group of users has detoured from the venue location;

providing a directive that identifies a time at which a user of one of the at least two mobile devices is to arrive at the venue location; and transmitting the processed data related to the updated queue to one of the at least two mobile devices to identify a position in the updated queue for the one of the at least two mobile devices; and transmitting the goal from the one or more common goals presented as options, the goal determined by a combination of the voting hierarchy and the one or more queue-related data objects communicated to the at least two mobile devices, the at least two mobile devices being distributed within the predetermined area, the goal including one or more of the venue locations of a plurality of venue locations, wherein transmitting the goal from said one or more common goals includes transmitting one or more queue-related data objects wirelessly to the at least two mobile devices, wherein the at least two mobile devices associated with each other are in a mesh network such that one of the at least two mobile devices directs the other of the at least two mobile devices, wherein a voting protocol is used to determine the venue location, and wherein one of the at least two mobile devices acts as a server to direct other mobile devices of the at least two mobile devices, wherein the at least two mobile devices are arranged in a hierarchy of mobile devices, and wherein when the one of the at least two mobile devices acting as the server is out-of-range of other mobile devices participating in the mesh network, another one of other mobile devices of the at least two mobile devices is designated as a new server based on the hierarchy of mobile devices.

16. The computer program product of claim 15 wherein the one or more acts further include:

updating a queue based on real-time location data received from the at least two mobile devices.

17. The computer program product of claim 16 wherein the one or more acts further include:

providing directives related to the updated queue to at least two users of the at least two mobile devices by taking into account the data identifying the location of the at least two mobile devices.

18. The computer program product of claim 15 wherein the one or more acts for processing the data to determine the queue includes:

processing the data by the one of the at least two mobile devices acting as the server, one of the at least two mobile devices acting as the server providing the processed data related to the updated queue via wirelessly transmitting to the other mobile devices of the at least two mobile devices to control positioning relative to one or more lines formed at the venue location prone to popularity.

19. The computer program product of claim 15 wherein the one or more acts further include:

loading one or more queue-related data objects onto a map of the predetermined area for transmission to the other mobile devices of the at least two mobile devices.

20. The computer program product of claim 15 wherein providing a directive that identifies a time at which a user of one of the at least two mobile devices is to arrive at the venue location further comprises:

providing a directive that identifies a time at which a user of one of the at least two mobile devices is to arrive at the venue location according to when an activity is to be presented at the venue location.

21. The computer program product of claim 20 wherein the one or more acts providing the directive that identifies the time includes:

providing the directive that identifies the time to a queuing module that determines the updated queue.

22. The computer program product of claim 20 wherein the one or more acts providing the directive includes:

providing the directive that identifies the time to the at least two mobile devices.

23. The computer program product of claim 15 wherein the one or more acts for processing the data to determine the updated queue includes:

processing the data by the one of the at least two mobile devices acting as the server, the one of the at least two mobile devices acting as the server providing the processed data related to the updated queue via wirelessly transmitting to the other of at least two mobile devices to control positioning relative to one or more lines formed at the venue location prone to popularity.

24. The computer program product of claim 15 wherein the one or more acts for processing the data to determine the updated queue includes:

processing the data by the one of the at least two mobile devices acting as the server, the one of the at least two mobile devices acting as the server providing the processed data related to the updated queue via wirelessly transmitting to a queuing module that determines the updated queue to control positioning relative to one or more lines formed at the venue location prone to popularity.

* * * * *